US011501754B2

(12) United States Patent
Knight et al.

(10) Patent No.: US 11,501,754 B2
(45) Date of Patent: Nov. 15, 2022

(54) SPECIFYING TRIP DESTINATIONS FROM SPOKEN DIALOGS

(71) Applicant: Beijing DiDi Infinity Technology and Development Co., Ltd., Beijing (CN)

(72) Inventors: Kevin Knight, Los Angeles, CA (US); Arkady Arkhangorodsky, Los Angeles, CA (US); Amittai Axelrod, Los Angeles, CA (US); Christopher Chu, Los Angeles, CA (US); Scot Fang, Los Angeles, CA (US); Yiqi Huang, Los Angeles, CA (US); Ajay Nagesh, Los Angeles, CA (US); Xing Shi, Los Angeles, CA (US); Boliang Zhang, Los Angeles, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 210 days.

(21) Appl. No.: 16/922,946

(22) Filed: Jul. 7, 2020

(65) Prior Publication Data

US 2022/0013108 A1 Jan. 13, 2022

(51) Int. Cl.
*G10L 15/06* (2013.01)
*G10L 15/22* (2006.01)
*G06F 3/16* (2006.01)

(52) U.S. Cl.
CPC .......... *G10L 15/063* (2013.01); *G06F 3/167* (2013.01); *G10L 15/22* (2013.01)

(58) Field of Classification Search
None
See application file for complete search history.

(56) References Cited

U.S. PATENT DOCUMENTS

| 2013/0275164 | A1* | 10/2013 | Gruber | G10L 15/22 705/5 |
| 2014/0229462 | A1* | 8/2014 | Lo | G06F 16/9038 707/707 |
| 2016/0298977 | A1* | 10/2016 | Newlin | G01C 21/3679 |
| 2017/0279747 | A1* | 9/2017 | Melzer | G06Q 30/0271 |

(Continued)

OTHER PUBLICATIONS

Antoine Bordes et al., "Learning end-to-end goal-oriented dialog", arXiv:1605.07683v4 [cs.CL] Mar. 30, 2017.

(Continued)

*Primary Examiner* — Jonathan C Kim
(74) *Attorney, Agent, or Firm* — Sheppard Mullin Richter & Hampton LLP

(57) ABSTRACT

Desired vehicle destinations may be determined from spoken dialogs. A speech input may be received from a user through a voice user interface. Current utterance variables may be obtained by tokenizing the user speech input. One or more of a plurality of utterance templates for a reply to the user speech input may be determined by a trained automatic agent based on the plurality of current utterance variables. One of a plurality of Application Programming Interfaces (API) to call and one or more parameters for the API to call with may be determine by the trained automatic agent based on the plurality of current utterance variables. A response may be obtained from the API call. A context string for the reply to the user speech input by the trained automatic agent may be constructed based on the utterance templates and the response of the API call.

17 Claims, 7 Drawing Sheets

(56) References Cited

U.S. PATENT DOCUMENTS

| | | | |
|---|---|---|---|
| 2018/0063326 A1* | 3/2018 | Tichauer | H04M 3/4936 |
| 2018/0143967 A1* | 5/2018 | Anbazhagan | G10L 15/183 |
| 2018/0366114 A1* | 12/2018 | Anbazhagan | G06F 3/167 |
| 2019/0222555 A1* | 7/2019 | Skinner | H04L 43/028 |
| 2020/0126540 A1* | 4/2020 | Panchamgam | H04L 51/046 |
| 2020/0251111 A1* | 8/2020 | Temkin | G10L 15/22 |
| 2021/0050006 A1* | 2/2021 | Andreas | G06F 40/30 |
| 2021/0192397 A1* | 6/2021 | Rastogi | G06F 40/20 |
| 2022/0013108 A1* | 1/2022 | Knight | G10L 15/063 |

OTHER PUBLICATIONS

Bhuwan Dhingra et al., "End-to-End Reinforcement Learning of Dialogue Agents for Information Access", arXiv:1609.00777V2 [cs.CL] Oct. 31, 2016.

Mihail Eric et al., "Key-value retrieval networks for task-oriented dialogue", ArXiv:1705.05414v2 [cs.CL] Jul. 14, 2017.

Miguel Espla-Gomis et al., "Paracrawl: Web-scale parallel corpora for the languages of the EU", Proceedings of MT Summit XXII, vol. 2, Dublin, Aug. 19-23, 2019, pp. 118-119.

Norman M. Fraser et al., "Simulating Speech Systems", 1991, Computer Speech & Language, 5(1):81-99.

A.G. Hauptmann, "Speech and gestures for graphic image manipulation", CHI'89 Proceedings, May 1989, pp. 241-245.

Matthew Henderson et al., "The second dialog state tracking challenge", 2014, In Proc. SIGDIAL.

William J. Hutchins et al., "An Introduction to Machine Translation", Table of Contents, 1992, Academic Press.

Daniel Jurafsky et al., "Speech and Language Processing", Second Edition, Chapter I: Introduction, Chapter 24 Chatbot & Dialogue Systems, 2020.

J.F. Kelley, "An Iterative Design Methodology for User-Friendly Natural Language Office Information Applications", 1984, ACM Trans. Inf. Syst., 2:26-41.

Dara Kerr, "Uber Dials it Back 20 Years, Bringing its Ride Service to Feature Phones", 2020, CNET. Feb. 13, 2020. https://cnet.co/3fPG7rC.

Philipp Koehn et al., "Moses: Open Source Toolkit for Statistical Machine Translation", Proceedings of the ACL 2007 Demo and Poster Sessions, Jun. 2007, Prague, pp. 177-180.

Xiujun Li et al., "End-to-End Task-Completion Neural Dialogue Systems", arXiv:1703.01008v4 [cs.CL] Feb. 11, 2018.

Abhinav Rastogi et al., "Towards Scalable Multi-Domain Conversational Agents: The Schema-Guided Dialogue Dataset", arXiv:1909.05855v2 [cs.CL] Jan. 29, 2020.

Verena Rieser et al., "A Corpus Collection and Annotation Framework for Learning Multimodal Clarification Strategies", 2005, In Proc. SIGDIAL.

Pararth Shah et al., "Bootstrapping a Neural Conversational Agent with Dialogue Self-Play, Crowdsourcing and On-Line Reinforcement Learning", 2018, In Proc. NAACL-HLT.

Ilya Sutskever et al., "Sequence to Sequence Learning with Neural Networks", arXiv:1409.3215v3 [cs.CL] Dec. 14, 2014.

Ashish Vaswani et al., "Attention is All You Need", arXiv:1706.03762v5 [cs.CL] Dec. 6, 2017.

Wei Wei et al., "AirDialogue: An Environment for Goal-Oriented Dialogue Research", Proceedings of the 2018 Conference on Empirical Methods in Natural Language Processing, Brussels, Belgium, Oct. 31-Nov. 4, 2018, pp. 3844-3854.

Jason D. Williams et al., "The Dialog State Tracking Challenge Series", AI Magazine, Competition Reports, Winter 2014, pp. 121-124.

Jason D. Williams et al., "End-to-End LSTM-Based Dialog Control Optimized with Supervised and Reinforcement Learning", arXiv:1606.01269v1 [cs.CL] Jun. 3, 2016.

Thomas Wolf et al., "Huggingface's Transformers: State-of-the-Art Natural Language Processing", arXiv:1910.03771v5 [cs.CL] Jul. 14, 2020.

Yizhe Zhang et al., "DialoGPT: Large-Scale Generative Pre-training for Conversational Response Generation", ar.Xiv:1911.00536v3 [cs.CL] May 2, 2020.

Tiancheng Zhao et al., "Towards End-to-End Learning for Dialog State Tracking and Management Using Deep Reinforcement Learning", arXiv:1606.02560v2 [cs.AI] Sep. 15, 2016.

Pawet Budzianowski, Tsung-Hsien Wen, Bo-Hsiang Tseng, Inigo Casanueva, Stefan Ultes, and Osman Ramadanand Milica Gasic. 2018. MultiWOZ—A Large-Scale Multi-Domain Wizard-of-Oz Dataset for Task-Oriented Dialogue Modelling. In Proc. EMNLP.

Jacob Devlin, Ming-Wei Chang, Kenton Lee, and Kristina Toutanova. 2018. Bert: Pre-training of Deep Bidirectional Transformers for Language Understanding. arXiv preprint arXiv:1810.04805.

Layla El Asri, Hannes Schulz, Shikhar Sharma, Jeremie Zumer, Justin Harris, Emery Fine, Rahul Mehrotra, and Kaheer Suleman. 2017. Frames: A Corpus for Adding Memory to Goal-Oriented Dialogue Systems. In Proc. SIGDIAL.

Alec Radford, Jeff Wu, Rewon Child, David Luan, Dario Amodei, and Ilya Sutskever. 2019. Language Models are Unsupervised Multitask Learners.

Tsung-Hsien Wen, David Vandyke, Nikola Mrksic, Milica Gasic, Lina M. Rojas-Barahona, Pei-Hao Su, Stefan Ultes, and Steve Young. 2017. A Network-based End-to-End Trainable Task-oriented Dialogue System. In Proc. EACL.

* cited by examiner

200

| | |
|---|---|
| User: | I want to go to Starbucks on Venice Boulevard. |
| Agent: | There is a Starbucks in Mar Vista. Are you okay with that one? |
| User: | Is it the one across from Coffee Connection? |
| Agent: | Starbucks is 141.1 feet away from Coffee Connection. It will take us 10 minutes to get there. Shall we go? |
| User: | Great, thanks. |
| Agent: | Great, we are going to Starbucks. |
| | |
| User: | I want to go to the airport. |
| Agent: | Do you mean LAX? |
| User: | Yes. |
| Agent: | Which terminal? |
| User: | Southwest Airlines |
| Agent: | That's Terminal 1. We'll head there now |
| | |
| User: | I want to go to a Mexican restaurant. It's on Lincoln Blvd. |
| Agent: | Is it called Clutch? |
| User: | No, but it is pretty close to there |
| Agent: | There is one called Casablanca which is a little further north. |
| User: | Oh. It's across the street from that. It might be on Rose, just off Lincoln. |
| Agent: | I think you mean La Cabana. Is that right? |
| User: | Hey, that's right. |
| Agent: | Great, we'll go there now. |
| | |
| User: | I want to go to Perch, downtown. |
| Agent: | Perch, the rooftop restaurant in downtown? |
| User: | Yes. |
| Agent: | there is a bit of traffic, so we will need 42 minutes t get there. |
| User: | Ok. |
| Agent: | Great. Heading out. |
| | |
| User: | I'd like to go to Big Bear Lake. |
| Agent: | Big Bear Lake is 121 miles east from our current location, and it takes around two and a half hours to reach there. |
| User: | Ok, let's go. |
| Agent: | Do you have a particular location in mind? |
| User: | No, anywhere on the lake is fine. |
| Agent: | Sure, we'll go now. |

```
import googlemaps
from maps_apis import *
gmaps = googlemaps.Client(key='xxxxxxxxxxxxxxxxxxxxxxxxxxx')

Initial variables
source_address = '4640 Admiralty Way, Marina del Rey'
source_latitude = 33.9816425
source_longitude = -118.4409761

# User utterance
print('User: I want to go to Starbucks on Venice Boulevard')
u1_0 = 'I'
u1_1 = 'want'
u1_2 = 'to'
u1_3 = 'go'
u1_4 = 'to'
u1_5 = 'Starbucks'
u1_6 = 'on'
u1_7 = 'Venice'
u1_8 = 'Boulevard'

# API call
api_variables = find_place(gmaps, u1_5 + " " + u1_7 + " " + u1_8,
source_latitude, source_longitude)
v1_address = load_variable(api_variables, 'address')
v1_name = load_variable(api_variables, 'name')
v1_latitude = load_variable(api_variables, 'latitude')
v1_longitude = load_variable(api_variables, 'longitude')
v1_place_id = load_variable(api_variables, 'place_id')
v1_street_name = load_variable(api_variables, 'street_name')
v1_neighborhood = load_variable(api_variables, 'neighborhood')
v1_locality = load_variable(api_variables, 'locality')

# Agent utterance
print('Agent: There is a { } in { }.'.format(v1_name, v1_neighborhood) )

# Agent utterance
print('Agent: Are you okay with that one?'.format( ) )
```

Context source_address = 4640 Admiralty Way, Marina del Rey
source_latlong = (33.9816425, -118.4409761)
USER: find a LA fitness near LAX
PREDICT: [ACTION] find_place [PARAM] LAX [PARAM] 33.9816425 [PARAM] -118.4409761
v1_address = 1 World Way, Los Angeles, CA 90015, United States
v1_name = Los Angeles International Airport
v1_latlong = (33.9816425, -118.4409761)
PREDICT:

Generate
[ACTION] find_place [PARAM] LA fitness [PARAM] (33.9816425, -118.4409761)

610: receiving a user speech input through a voice user interface

620: obtaining a plurality of current utterance variables by tokenizing the user speech input

630: determining, by a trained automatic agent, one or more of a plurality of utterance templates for a reply to the user speech input based on the plurality of current utterance variables

640: determining, by the trained automatic agent based on the plurality of current utterance variables, one of a plurality of Application Programming Interfaces (API) to call and one or more parameters for the API to call with, wherein the one or more parameters are based on information of the plurality of current utterance variables

650: obtaining a response from the API call

660: constructing a context string for the reply to the user speech input by the trained automatic agent based on the one or more of the plurality of utterance templates and the response of the API call

FIG. 6

SPECIFYING TRIP DESTINATIONS FROM SPOKEN DIALOGS

TECHNICAL FIELD

The disclosure relates generally to learning how to identify desired vehicle destinations from spoken dialogs.

BACKGROUND

Spoken dialog may provide a natural human interface to complex systems. Spoken dialog is becoming more popular due to speech-enabled cell phones, smart speakers, and automated personal assistants. However, in spatial domains like city travel, the predominant user interface is graphical and touch-based. Systems may display places on maps, and users may browse around those maps. Sometimes this predominant graphical interface is not convenient, for example, when a user is talking to a smart speaker. Intelligent dialog must take the place of visual feedback. In particular, it may be difficult to order a shared-ride vehicle using a speech-only dialog system.

SUMMARY

Various embodiments of the specification include, but are not limited to, systems, methods, and non-transitory computer readable media for determining a destination.

In various implementations, a method may include receiving a speech input from a user through a voice user interface, and obtaining a plurality of current utterance variables by tokenizing the user speech input. The method may further include determining, by a trained automatic agent, one or more of a plurality of utterance templates for a reply to the user speech input based on the plurality of current utterance variables. The method may further include determining, by the automatic agent based on the plurality of current utterance variables, one of a plurality of Application Programming Interfaces (API) to call and one or more parameters for the API to call with, wherein the one or more parameters are based on information of the plurality of current utterance variables. The method may further include obtaining a response from the API call, and constructing a context string for the reply to the user speech input by the trained automatic agent based on the one or more of the plurality of utterance templates and the response of the API call.

In another aspect of the present disclosure, a computing system may comprise one or more processors and one or more non-transitory computer-readable memories coupled to the one or more processors and configured with instructions executable by the one or more processors. Executing the instructions may cause the system to perform operations. The operations may include receiving a speech input from a user through a voice user interface, and obtaining a plurality of current utterance variables by tokenizing the speech input of the user. The operations may further include determining, by a trained automatic agent, one or more of a plurality of utterance templates for a reply to the user speech input based on the plurality of current utterance variables. The operations may further include determining, by the automatic agent based on the plurality of current utterance variables, one of a plurality of Application Programming Interfaces (API) to call and one or more parameters for the API to call with, wherein the one or more parameters are based on information of the plurality of current utterance variables. The operations may further include obtaining a response from the API call, and constructing a context string for the reply to the user speech input by the trained automatic agent based on the one or more of the plurality of utterance templates and the response of the API call.

Yet another aspect of the present disclosure is directed to a non-transitory computer-readable storage medium configured with instructions executable by one or more processors to cause the one or more processors to perform operations. The operations may include receiving a speech input from a user through a voice user interface, and obtaining a plurality of current utterance variables by tokenizing the speech input of the user. The operations may further include determining, by a trained automatic agent, one or more of a plurality of utterance templates for a reply to the user speech input based on the plurality of current utterance variables. The operations may further include determining, by the automatic agent based on the plurality of current utterance variables, one of a plurality of Application Programming Interfaces (API) to call and one or more parameters for the API to call with, wherein the one or more parameters are based on information of the plurality of current utterance variables. The operations may further include obtaining a response from the API call, and constructing a context string for the reply to the user speech input by the trained automatic agent based on the one or more of the plurality of utterance templates and the response of the API call.

In some embodiments, the trained automatic agent may be trained based on a training corpus. The training corpus may include a plurality of training samples. The plurality of training samples may be collected by listing the plurality of utterance templates and the plurality of APIs in a Graphical User Interface (GUI) for a training agent to select from. A training user speech input may be tokenized into a plurality of training utterance variables. One or more of the plurality of training utterance templates, one or more of the plurality of APIs, and one or more of the plurality of training utterance variables that the training agent selects through the GUI may be recorded in response to the training user speech input as a training sample of the plurality of training samples.

In some embodiments, each of the plurality of training samples may be recorded as fully-executable Python code.

In some embodiment, a button may be provided for the training agent to add a new utterance template that is available for other agents to use.

In some embodiments, the trained automatic agent may include a Bidirectional Encoder Representations from Transformers (BERT) natural language processing model. In some embodiments, the trained automatic agent may include a generative pre-trained natural language processing model.

In some embodiments, the API call may include a find-place API call.

In some embodiments, the one or more parameters may include a name of a trip destination from the plurality of current utterance variables and a starting location obtained locally. In some embodiments, the response from the API call may include a latitude and longitude of a destination prediction.

In some embodiments, the one or more parameters may include a starting location obtained locally and a destination. In some embodiments, the response from the API call may include a distance and a duration from the starting location to the destination.

In some embodiments, constructing the context string or the reply to the user speech input by the trained automatic agent may include concatenating at least one of the current utterance variables and the response of the API call onto an existing context string.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which:

FIG. 2 illustrates an exemplary human/human dialog, in accordance with various embodiments.

FIG. 4 illustrates exemplary log of agent/user sessions, in accordance with various embodiments.

FIG. 5 illustrates an exemplary dialog representation, in accordance with various embodiments.

FIG. 6 illustrates a flowchart of an exemplary method, according to various embodiments of the present disclosure.

DETAILED DESCRIPTION OF THE EMBODIMENTS

Figure 1:
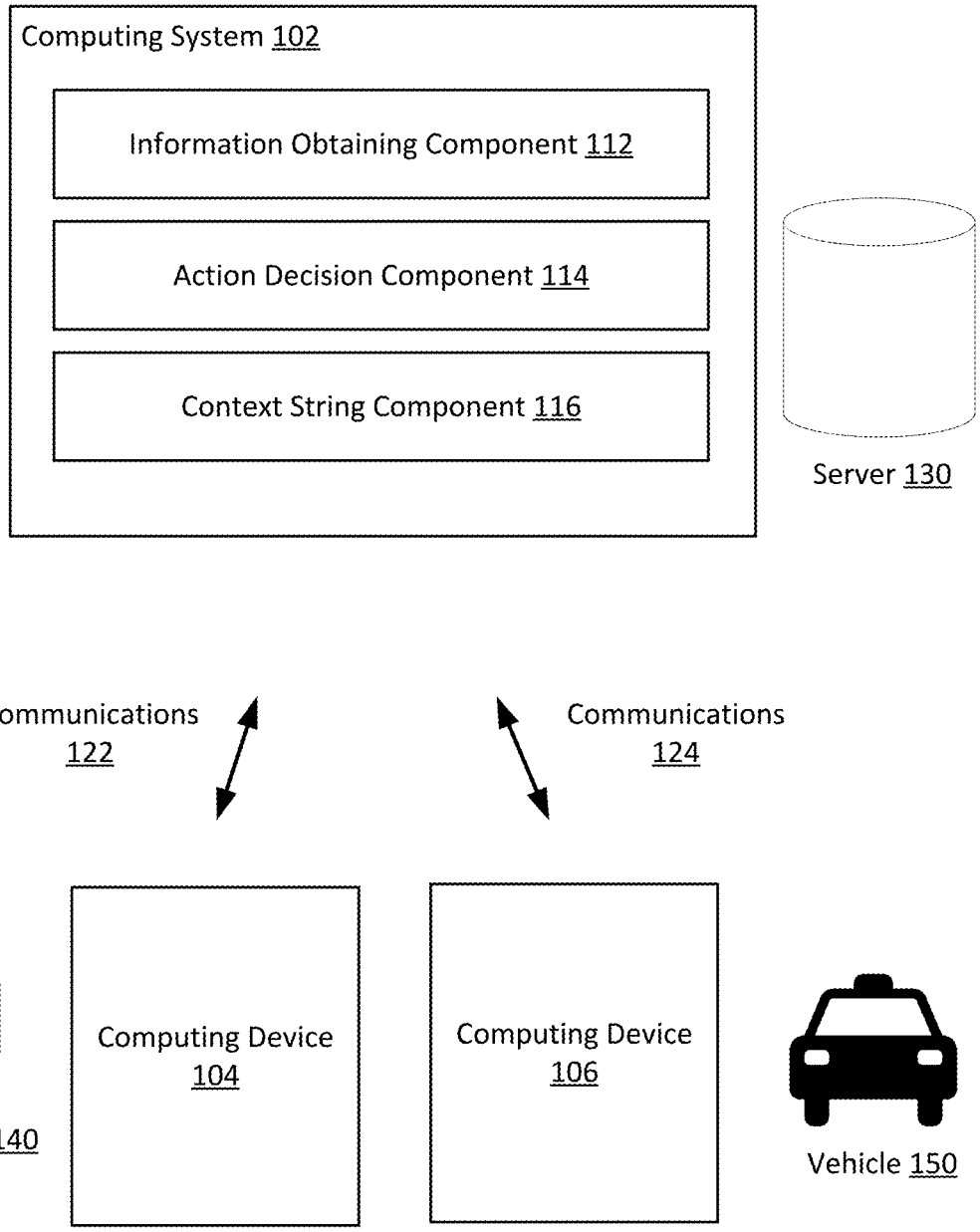
FIG. 1 illustrates an exemplary system to which techniques for determining a destination may be applied, in accordance with various embodiments.

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein may create a dialog corpus to train a speech-only assistant which may allow users to specify trip destinations. Use cases may include talking to an in-home smart-speaker to order a shared-ride vehicle, or telling an autonomous vehicle where to go. This is a challenging domain, as the system and user must come to a common understanding confidently without a visual shared map. A successful dialog may include one in which the system subsequently directs a vehicle to a destination that is approved by the user.

In some embodiments, a human/human data collection method may be used, wherein human agents are given considerable freedom in terms of API calls and utterances, but they are constrained to work within a push-button environment. Session logs may record all user and system choices, and may be fully executable. Systems may generalize beyond the stored sessions to determine what buttons to push, and when. A dialog corpus may be created and trip-destination systems may be evaluated.

In some embodiments, a shared-ride vehicle may be ordered using a speech-only dialog system. For example, a shared-ride car may be ordered using Alexa (a virtual AI assistant). In another example, a rider may step into an autonomous vehicle (e.g., taxi) and tell the vehicle where to go. The system's goal may include extracting a latitude longitude pair from the user, through natural conversation. Another goal may include assuring the user that the guessed latitude longitude pair is indeed correct, before the vehicle performs any final action. This assurance must also be accomplished through natural conversation. The final output of the dialog may include a latitude longitude pair of a destination.

A three step solution may be used to allow users to specify trip destinations through speech. First, a corpus of dialogs may be created in the domain of specifying a trip destination. Second, a human agent interface may be developed which reduces all agent activity (e.g., API calls, utterances) to a series of clicks, yet maintains enough flexibility to satisfy all users in this domain. Third, a machine-learning system may be developed which aims to respond to user utterances by reproducing appropriate sequences of agent clicks. The accuracy of the machine-learning system may be evaluated both at the click-level and the dialog-success-level.

FIG. 1 illustrates an exemplary system 100 to which techniques for determining a destination may be applied, in accordance with various embodiments. The example system 100 may include a computing system 102, a computing device 104, and a computing device 106. It is to be understood that although two computing devices are shown in FIG. 1, any number of computing devices may be included in the system 100. Computing system 102 may be implemented in one or more networks (e.g., enterprise networks), one or more endpoints, one or more servers (e.g., server 130), or one or more clouds. The server 130 may include hardware or software which manages access to a centralized resource or service in a network. A cloud may include a cluster of servers and other devices which are distributed across a network.

The computing devices 104 and 106 may be implemented on or as various devices such as a mobile phone, tablet, server, desktop computer, laptop computer, etc. The computing devices 104 and 106 may each be associated with one or more vehicles (e.g., car, truck, boat, train, autonomous vehicle, electric scooter, electric bike, etc.). The computing devices 104 and 106 may each be implemented as an in-vehicle computer or as a mobile phone used in association with the one or more vehicles. The computing system 102 may communicate with the computing devices 104 and 106, and other computing devices. Computing devices 104 and 106 may communicate with each other through computing system 102, and may communicate with each other directly. Communication between devices may occur over the internet, through a local network (e.g., LAN), or through direct communication (e.g., BLUETOOTH™, radio frequency, infrared).

In some embodiments, the system 100 may include a ridesharing platform. The ridesharing platform may facilitate transportation service by connecting drivers of vehicles with passengers. The platform may accept requests for transportation from passengers, identify idle vehicles to fulfill the requests, arrange for pick-ups, and process transactions. For example, passenger 140 may use the computing device 104 to order a trip. The trip order may be included in communications 122. The computing device 104 may be installed with a software application, a web application, an API, or another suitable interface associated with the ridesharing platform.

The computing system 102 may receive the request and reply with price quote data and price discount data for one or more trips. The price quote data and price discount data for one or more trips may be included in communications 122. When the passenger 140 selects a trip, the computing system 102 may relay trip information to various drivers of idle vehicles. The trip information may be included in communications 124. For example, the request may be posted to computing device 106 carried by the driver of vehicle 150, as well as other commuting devices carried by other drivers. The driver of vehicle 150 may accept the posted transportation request. The acceptance may be sent to computing system 102 and may be included in communications 124. The computing system 102 may send match data to the passenger 140 through computing device 104. The match data may be included in communications 122. The match data may also be sent to the driver of vehicle 150 through computing device 106 and may be included in communications 124. The match data may include pick-up location information, fees, passenger information, driver information, and vehicle information. The matched vehicle may then be dispatched to the requesting passenger. The fees may include transportation fees and may be transacted among the system 102, the computing device 104, and the computing device 106. The fees may be included in communications 122 and 124. The communications 122 and 124 may additionally include observations of the status of the ridesharing platform. For example, the observations may be included in the initial status of the ridesharing platform obtained by information component 112 and described in more detail below.

While the computing system 102 is shown in FIG. 1 as a single entity, this is merely for ease of reference and is not meant to be limiting. One or more components or one or more functionalities of the computing system 102 described herein may be implemented in a single computing device or multiple computing devices. The computing system 102 may include an information obtaining component 112, an action decision component 114, and a context string component 116. The computing system 102 may include other components. The computing system 102 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and one or more memories (e.g., permanent memory, temporary memory, non-transitory computer-readable storage medium). The one or more memories may be configured with instructions executable by the one or more processors. The processor(s) may be configured to perform various operations by interpreting machine-readable instructions stored in the memory. The computing system 102 may be installed with appropriate software (e.g., platform program, etc.) and/or hardware (e.g., wires, wireless connections, etc.) to access other devices of the system 100.

The information obtaining component 112 may be configured to receive a speech input from a user through a voice user interface. For example, the user may specify a trip destination to a speech-only assistant. The user may talk to an in-home smart-speaker to order a shared-ride vehicle, or the user may tell an autonomous vehicle where to go. The information obtaining component 112 may further be configured to obtain a plurality of current utterance variables by tokenizing the user speech input. Obtaining information may include one or more of accessing, acquiring, analyzing, determining, examining, identifying, loading, locating, opening, receiving, retrieving, reviewing, storing, or otherwise obtaining the information. Tokenizing the speech input of the user may include splitting each word or phrase into a separate variable.

The action decision component 114 may be configured to determine, by a trained automatic agent, one or more of a plurality of utterance templates for a reply to the user speech input based on the plurality of current utterance variables. In some embodiments, the trained automatic agent may be trained based on a training corpus. The training corpus may include a plurality of training samples. In some embodiments, the training samples may include a sequence of actions and user utterances used to specify a trip destination. In some embodiments, each of the plurality of training samples may be collected by listing the plurality of utterance templates and the plurality of APIs in a Graphical User Interface (GUI) for a training agent to select from. A training user speech input may be tokenized into a plurality of training utterance variables. One or more of the plurality of training utterance templates, one or more of the plurality of APIs, and one or more of the plurality of training utterance variables that the agent selects through the GUI may be recorded in response to the training user speech input as a training sample of the plurality of training samples. In some embodiments, each of the plurality of training samples may be recorded as fully-executable Python code. In some embodiments, a button may be provided for the training agent to add a new utterance template that is available for other agents to use. In some embodiments, the trained automatic agent may include a Bidirectional Encoder Representations from Transformers (BERT) natural language processing model. In some embodiments, the trained automatic agent may include a generative pre-trained natural language processing model. For example, the trained automatic agent may include a Generative Pretrained Transformer (GPT) or a Generative Pretrained Transformer 2 (GPT-2).

In some embodiments, a machine-learning system may be developed to create and evaluate automatic dialog agents. The accuracy of the machine-learning system may be evaluated both at the click-level and the dialog-success-level. The automatic dialog agents may be built based on evaluation metrics. For example, all agents may be extrinsically evaluated according to successful task completion rate in live dialogs with test users. After each dialog, the user may be shown the target lat/long destination on a map, and may be asked to approve or disapprove the agent's final decision. In another example, an intrinsic metric may evaluate what to do next at a finer grain. Because trained agents are intended to mimic human agent decisions seen in the training data, how often their individual "click decisions" match those of human agents may be tested. Each train/dev/test example may consist of the session so far and the next action to be predicted. The next action may be an API selection, a parameter selection for an API, a template selection, or a parameter selection for a template.

The action decision component 114 may further be configured to determine, by the automatic agent based on the plurality of current utterance variables, one of a plurality of Application Programming Interfaces (API) to call and one or more parameters for the API to call with. The one or more parameters may be based on information of the plurality of current utterance variables. For example, the one or more parameters may include at least one of the plurality of current utterance variables. The action decision component 114 may further be configured to obtain a response from the API call. In some embodiments, the query may be a find place API call.

In some embodiments, the one or more parameters may include a name of a trip destination from the plurality of current utterance variables and a starting location obtained locally, and the response from the API call may include a latitude and longitude of a destination prediction. In some embodiments, the one or more parameters may include a starting location obtained locally and a destination, and the response from the API call may include a distance and a duration from the starting location to the destination.

The context string component 116 may be configured to construct a context string for the reply to the user speech input by the trained automatic agent based on the one or more of the plurality of utterance templates and the response of the API call. In some embodiments, constructing a context string for the reply to the user speech input by the trained automatic agent may include concatenating at least one of the current utterance variables and the response of the API call onto an existing context string.

The machine-learning system may respond to user utterances by reproducing appropriate sequences of agent clicks. All predictions may correspond to agent clicks, except for the string-query parameters to find_place and places_nearby. For example, creating the string query "Starbucks Venice Boulevard" may take three clicks, but may be considered one prediction. After replying to a user, a human agent may flexibly wait for the user's next utterance. There may not be a special button in the interface for the agent to click to wait for the user. Instead, a special "wait for user" API call may be added between agent templates and user utterances in the collected data, so that automatic agents can learn when to wait for the user.

To better understand the agent clicks and study the system behaviors in different conditions, agent clicks may be categorized into action clicks, query clicks, and parameter clicks. Action clicks may include for API and template selection, such as find place and "It is { } away." Query clicks may include the query selection for certain API calls (e.g., "Starbucks in Venice"), and parameter clicks may include the parameter selections, such as latitude and longitude. If the automatic agent does not match the human click decision, it may lose an accuracy point. However, the automatic agent may then be brought back on track so that the next example's session-so-far will end with the human decision, not the automatic agent's. As a result, automatic agents cannot veer off track during intrinsic evaluation, unlike extrinsic evaluation, where automatic agents can veer off track.

Several automatic agents may be constructed to determine order destinations from speech. A hand-built agent may be constructed out of rules and states derived from patterns in the training dialogs, in iterative fashion. The following state variables may persist across turns within the agent, and may be updated at any turn. A destination variable may include the agent's guess for the user's desired destination. The destination may be represented as an entity that includes sub-variables such as latitude, longitude, name of establishment, etc. This entity may be retrieved via string queries like "Starbucks near Lincoln Blvd" issued to Google Map APIs. The destination may also be represented as a list of multiple entities to give the user more options (e.g. if the user asks "Are there any pizza places nearby?"). A query variable may include the query string used as input to Google Maps APIs to retrieve destinations. In some embodiments, this string may be updated across multiple turns.

A relative landmark variable may have the same representation as Destination. The variable may be used by the Google Maps API to find places nearby a relative landmark (e.g. if the user asks "Find me a Starbucks near Dodger Stadium", then "Dodger Stadium" may be included in the input query for Relative Landmark). The set of actions the agent is capable of taking may be limited. The set of actions may include core actions, including refining and updating the query state variable, issuing Google Maps API calls and offering destination options to the user, retrieving a destination's attributes (e.g., star-rating, open/closed), and deciding that the user is satisfied with the suggested destination and ending the dialog.

In some embodiments, keyword-based rules may be used in order for the agent to decide the next action to take. Indicators may be designed that are each triggered by a hand-built list of keywords. If a user utterance in a single turn contains any of the keywords, the corresponding indicator may trigger. The indicators may include YES, NO, PLACES-NEARBY, and CLEAR-CONTEXT. The YES trigger may indicate user confirmation, and may be used to decides whether the user is happy with the agent's suggested destination to start driving (e.g. "Yes, let's go!"). The NO trigger may indicate the user is denying the suggested destination, in which case agents may try to find a better destination (e.g. "No, not that one."). The PLACES-NEARBY trigger may be used to decide whether the agent gives the user a single destination option, or multiple options. For example, if the user says "Can you take me to a hair salon nearby", the user may be given multiple options. The RELATIVE-LANDMARK trigger may indicate that the user is talking about a landmark near the destination, but not the destination itself (e.g. "Is it across the street from Target?"). The CLEAR-CONTEXT trigger may indicate that the user wants to reset the Query state variable (e.g. "Actually, I want to go to KFC now.").

In some embodiments, tasks for the agent may include to extract query strings from user utterances. These queries may be used to issue Google Maps API calls. For example, if the user says, "I want to go to a Starbucks in Culver City", a reasonable query to extract may include "Starbucks Culver City". A stop-word list may be constructed to strip irrelevant words from user utterances. For example, the stop-word list may be created via a combination of hand-selection and high-frequency words in the training dialogs. In some embodiments, the Query state variable may only be updated if the keyword-based rules determine that the current user utterance is suitable for query extraction.

In some embodiments, query contexts may span multiple user utterances. For example, a dialog may take the form:
User: "I want to go to Starbucks."
Agent: "I found a Starbucks on Lincoln Blvd, it is 3 min and 0.5 miles away."
User: "I was thinking the one in Culver City."

In this case, a good query to extract may include "Starbucks Culver City". The agent may handle these multiturn contexts by appending to the Query state variable, unless the keyword-based rule for clearing query context is triggered (e.g. if the user says "Actually, I'd like to go to a KFC instead"), in which case the Query state variable may be reset.

In some embodiments, a generic agent response may be given when a user's utterance does not help the agent find a better destination. For example, the user utterance may not result in any change to the current Query state variable, or issuing the query to the Google Maps API may not return any destinations. An example generic agent response may include "I'm sorry, I couldn't find anything. Could you be more specific?" in order to encourage the user to respond in an informative way.

For natural language generation, the hand-built agent may insert its state variables into simple templates such as "I found ¡destination-name¡ on ¿street¿ in ¿city¿. It is ¿x-minutes¿ and ¿y-miles¿, away. Shall we go?" In some embodiments, each state may have only one possible template so that there is no variation in the natural language generation.

A secondary task of the agent may include to provide destination attributes, such as its city or its rating to the user. This retrieval may be triggered in a similar way to the Keyword-Based rules. For example, if a user asks "What is its rating?" the rating sub-variable may be retrieved from the Destination state variables.

In some embodiments, the machine-learned agent may be bidirectionally trained in advance. For example, an approach similar to BERT may be used. However, while BERT traditionally uses text sequences, the machine-learned agent may be may be trained using any sequence of actions. For example, the machine-learned agent may be may be trained using predetermined sequences of clicks. Clicks may be classified into three prediction categories: action, query, and parameter. Action click prediction may predicts the API or template to invoke, given the previous user and agent context. The previous contexts may include information retrieved from previous API calls. Query click prediction may locate the query for API calls from utterances. For example, "Starbucks" may be identified in the user utterance "I want to go to Starbucks," as a query for API find_place. Parameter click prediction may assign appropriate variables retrieved by API calls to actions (e.g., APIs and templates). For example, the machine-learned agent may select the API call variable "duration" to fill the blank in template "It is { } away."

In some embodiments, the click prediction may be cast as a sequence labeling task. A partial dialog may be converted into a sequence of text (i.e., input), and spans of the text may be labeled as action, query, or parameter (i.e., output). A token type set may be constructed which includes APIs, templates, and two special types "QUERY" and "PARAMETER" which indicate query and parameter tokens. The label set may be generated from this token type set using BIO tagging schema, where B represents beginning of the span, I represents inside of the span, and O represents tokens that have no type. The dialog context string may then be created. The previous user utterances, agent utterances, API calls, and variables may be concatenated in order. A start of the sequence token "[CLS]" may be added at the beginning to comply with BERT. For action prediction, the label of the next action may be assigned to "[CLS]". For query and variable prediction, the query and variable spans may be labeled in the context using "B-QUERY", "I-QUERY", "B-PARAMETER" and "I-PARAMETER".

The context string may differ between action, query and variable prediction, as query and variable predictions may require additional temporal context, which is the content that the current prediction is associated with. For example, query prediction may be associated with the API temporal context "[AGENT] find place" and the second parameter of template "It is { } and { } away." may be associated with the temporal context "[AGENT] It is { } and { } away [PARAM] v1 distance=5 mi". Capitalized words inside brackets may represent special tokens. For action prediction, temporal context may be empty. Similar to BERT, "[SEP]" may be used as a delimiter to concatenate the dialog context and temporal context, and then feed them into the BERT encoder. The model may be optimized based on the cross-entropy loss over a label sized fully connected layer.

Shared-ride travel may be provided on a global level and may involve different languages, different cities, and different backend map API systems. In some embodiments, agent interfaces may be built with templates in different languages. Human/human dialog corpora may be collected in different languages, and the automatic agents may be trained in different languages.

In some embodiments, a framework may surround the automatic agent with a machine-translation software layer. Everything the user says may automatically translated into English before the utterances are analyzed by the agent. All of the responses from the agent may be translated back into the user's language (e.g., at the last minute). In between the translations, the English-speaking automatic agent may behave as normal. For example, a sample dialog in Spanish may include a start-travel point at the Zo'colo in Mexico City. The dialog may include:

Agent: ¡Hola! ¿A donde to gustaría it hoy?
User: Al Museo Nacional de Antropología, por favor.
Agent: Encontré el Museo Nacional de Antropología en la Avenida Paseo de la Reforma, ¿está bien?
User: Está bien.
Agent: Está a 4.9 millas y 29 minutos de distancia.
Agent: ¿Nos vamos?
User: OK.

Surrounding the agent with a translation framework may only require one agent to be maintained, rather than many agents that speak many languages. Improving the accuracy of that one agent may allow the other languages benefit.

In some embodiments, the Google Maps API may be used for its strong query processing. For example, the Google Maps API may be used for North America, South America, and Europe. some embodiments, a version of the learned agent may be constructed which uses a different map system, with the same set of API calls (e.g., DiDi). For example, different map systems may be used for North America and China.

FIG. 2 illustrates an exemplary human/human dialog 200, in accordance with various embodiments. In some embodiments, the human/human dialog 200 may be collected from two humans communicating through a command-line interface. One human may play the role of the user, and the other may play the role of the agent. For example, the Wizard-of-Oz framework for dialog collection may be adopted. The user's goals may include to specify a trip destination to an automated voice assistant or autonomous vehicle. The agent's goals may include to obtain a correct destination and to provide the user with assurance that it has gotten the destination right. The agent's last utterance may signal that the agent is taking physical action in the real world, such as dispatching or driving.

Through this initial collection, it may be determined that users have two types of destinations. First, users may have precise destinations that the user can name and visualize in their mind (e.g., a restaurant named Irori Sushi in Marina del Rey). The user typically does not know the precise address of the destination, and occasionally cannot even remember the name. Second, users may have activities which they want to go and do (e.g., eating tacos, buying clothes, or playing pool). The agent may find and suggest appropriate places that the user may have never heard of. In this initial collection, the agent may be free to use tools like Google Maps and Yelp in a separate browser window or tab.

An automatic agent which imitates a human agent may be built by training on the collected dialog corpus. However, an automatic agent may not be trained from the dialogs in FIG. 2, because the corpus only tracks what the agent says, and not what the agent does. The agent may first click, scroll, and type queries into external applications such as Google Maps. For example, the agent might look up two places on the map and visually confirm that they are close to one another. These actions are may not be tracked or logged in FIG. 2.

In some embodiments, human/human dialog 200 may include three categories of predictions which may be formulated into sequence labeling problems. For example, at the fourth turn, and the agent is about to reply to the user, after receiving user utterance "Is it the one across from Coffee Connection?". The next command for the agent to execute may be: find_place("Coffee Connection", v1 latitude, v1 longitude).

First, the action that the agent will take may be predicted. The dialog context string may be: [CLS] [USER] I want to go to Starbucks . . . [AGENT] find-place [VAR] v1 name=Starbucks [AGENT] There is a Starbucks . . . [AGENT] Are you okay . . . [USER] Is it . . . from Coffee Connection? [SEP]. The temporal context may be empty. The label "B-find place" may be assigned to "[CLS]" token and the label "O" may be assigned to all other tokens.

The query of find_place may then be identified. [AGENT] find place may be appended to the context (replacing underscore with space for API names): [CLS] [USER] I want to go to Starbucks . . . [AGENT] find_place [VAR] v1 name=Starbucks [AGENT] There is a Starbucks . . . [AGENT] Are you okay . . . [USER] Is it . . . from Coffee Connection? [SEP] [AGENT] find place. Then, the label "B-QUERY" may be assigned to "Coffee", and "I-QUERY" to "Connection". Labels of other tokens may be "0".

To predict the second parameter of find_place, the query may be appended to the context, and the candidate variables [VAR] source latitude| . . . and [VAR] v1 latitude| . . . may be introduced into the context: [CLS] [VAR] source latitude|name=source . . . [USER]|I want to go to Starbucks . . . [AGENT] find_place [VAR] v1 latitude|name=Starbucks, neighborhood=Mar Vista . . . [AGENT] There is a Starbucks . . . [AGENT] Are you okay . . . [USER] Is it . . . from Coffee Connection? [SEP] [AGENT] find place [PARAM] Coffee Connection. Here, the underlined tokens may represent the correct parameter for the action. "B-PARAMETER" may be assigned to "[VAR]" and "I-PARAMETER" may be assigned to the rest of the underlined words.

Inserted variables may come from invoked API calls, except for source latitude and longitude, which may be preset. As the dialogs become longer, the number of candidates may increase, and the machine may learn to choose the correct variable. Instead of showing all variables to the machine, which may introduce noise, variables whose types are valid may be shown. For example, the second parameter of find place may always be latitude in the training set, so only latitude variables may be presented in the context. The parameter type information may be obtained from the training data, for both API calls and templates. The same process may be used to predict the third parameter "v1 longitude". The three prediction tasks may share the same BERT encoder as well as the label sized fully connected layer at the top.

Figure 3:
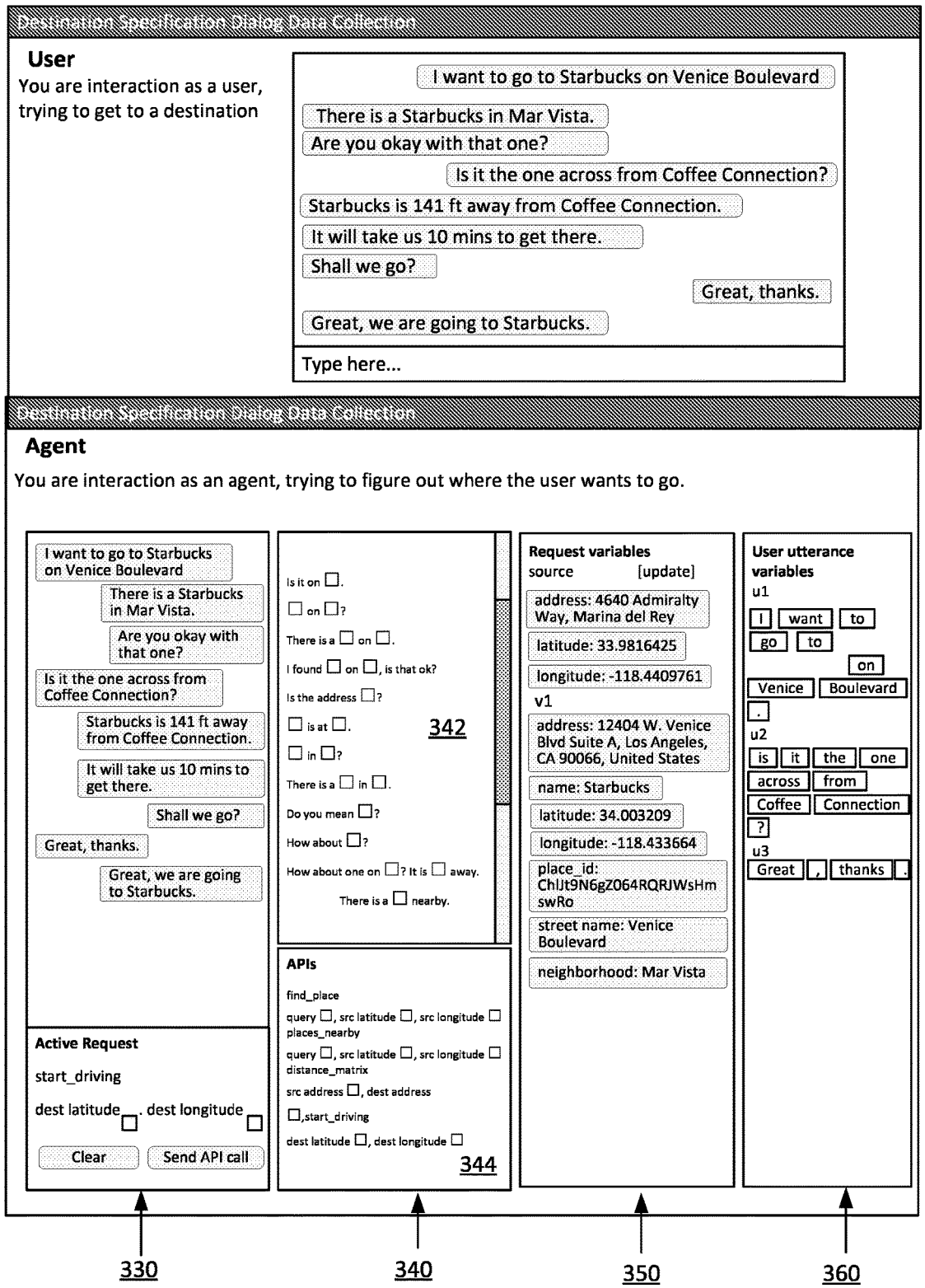
FIG. 3 illustrates exemplary dialog collection interfaces, in accordance with various embodiments.

FIG. 3 illustrates exemplary dialog collection interfaces 310 and 320, in accordance with various embodiments. The dialog collection interface 310 may include a user side interface and may allow open chat. The dialog collection interface 320 may include an agent side interface and may constrain the agent's actions and utterances. The first agent panel 330 may show the chat. The second agent panel 340 may show the agent's available actions, including utterance templates 342 and API calls 344. Results of API calls may be shown in the third agent panel 350, and tokenized user utterances may be shown in the fourth agent panel 360.

In some embodiments, agent actions may be restricted to a sequence of clicks. For example, after the user types "I want to go to Starbucks on Venice Boulevard", the agent may perform the following sequence of actions. First, the agent may click on find_place API from Google. This API takes a string argument and a source latitude longitude pair. The agent may then click on the words "Starbucks", "Venice", and "Boulevard" in the fourth panel, and click on the source latitude longitude pair in the third panel. This may call the find_place API in real-time and further populate the third panel with its result, collected under v1. Next, the agent may click on the distance_matrix API. This API may take two addresses, and return the time and distance between them. The agent may click on the address field of variable v1 (e.g., Starbucks), the click on the address field of source. This may call the distance_matrix API and further populate the third panel. Next, the agent may click on the template "{ } on { } is { } minutes away." This template may take three arguments. The agent may click on the name field of variable v1 (e.g., "Starbucks"), the street name field of variable v1 (e.g., "Venice Boulevard"), and the duration field of variable v2. Finally, the agent may click on the template "Shall we go?" These 11 clicks may result in sending the following response to the user: "Starbucks on Venice Boulevard is 10 minutes away. Shall we go?"

In some embodiments, an agent may click on "+" at any time to make a new utterance template, which then may be made available to all agents. The constrained interface may allow all of the agent's actions, not just their words, to be logged and made available for analysis. No additional dialog annotations may be required from agents or users. The only requirements are those required to converse and solve the problem.

FIG. 4 illustrates exemplary log of agent/user sessions 400, in accordance with various embodiments. In some embodiments, the exemplary log of agent/user sessions 400 may be logged as fully-executable Python code. If the session log file is run, a faithful replay of the session may be obtained, in which the same APIs are called, and the same utterances formed. Pieces of code in a session log may respond to user utterances in the same way that the human agent did. An automatic agent may be taught to create and select relevant pieces of code (or equivalently, clicks) in new dialog contexts.

FIG. 5 illustrates an exemplary dialog representation 500, in accordance with various embodiments. In some embodiments, the dialog representation 500 may be used for training and deploying a GPT based automatic agent. In some embodiments, the machine-learned agent may include a GPT-2. GPT-2 may take the start of a string and finish the string. GPT-2 may be adapted to take in input strings of variables and tokens. A GPT-2 model may be fined-tuned on the dialog corpus. GPT-2 may be used in generating realistic text, and may also be fine-tuned to generate human-like text on a range of domains, including dialog. In some embodiments, the dialogs may be represented in text format, including all user utterances, agent utterances, API calls, and their returned variables. The model may be fine-tuned on the causal language modeling objective using this data. To produce the agent's action at a given turn, the dialog may be used for context and the next line of text may be generated, which may correspond to the agent's predicted action.

Modifications may be used to improve the performance of the GPT-2 model. For example, variable names may be generated instead of variable values. Replacing underscores in variable names with spaces may be used to better leverage GPT's pre-trained representations of the word pieces. In some embodiments, DialoGPT may be used as a starting point instead of GPT-2 base.

FIG. 6 illustrates a flowchart of an exemplary method 600, according to various embodiments of the present disclosure. The method 600 may be implemented in various environments including, for example, the system 100 of FIG. 1. The method 600 may be performed by computing system 102. The operations of the method 600 presented below are intended to be illustrative. Depending on the implementation, the method 600 may include additional, fewer, or alternative steps performed in various orders or in parallel. The method 600 may be implemented in various computing systems or devices including one or more processors.

With respect to the method 600, at block 610, a speech input may be received from a user through a voice user interface. At block 620, a plurality of current utterance variables may be obtained by tokenizing the user speech input. At block 630, one or more of a plurality of utterance templates for a reply to the user speech input may be determined by a trained automatic agent based on the plurality of current utterance variables. At block 640, one of a plurality of Application Programming Interfaces (API) to call and one or more parameters for the API to call with may be determine by the trained automatic agent based on the plurality of current utterance variables. The one or more parameters may be based on information of the plurality of current utterance variables. At block 650, a response may be obtained from the API call. At block 660, a context string for the reply to the user speech input by the trained automatic agent may be constructed based on the one or more of the plurality of utterance templates and the response of the API call.

Figure 7:
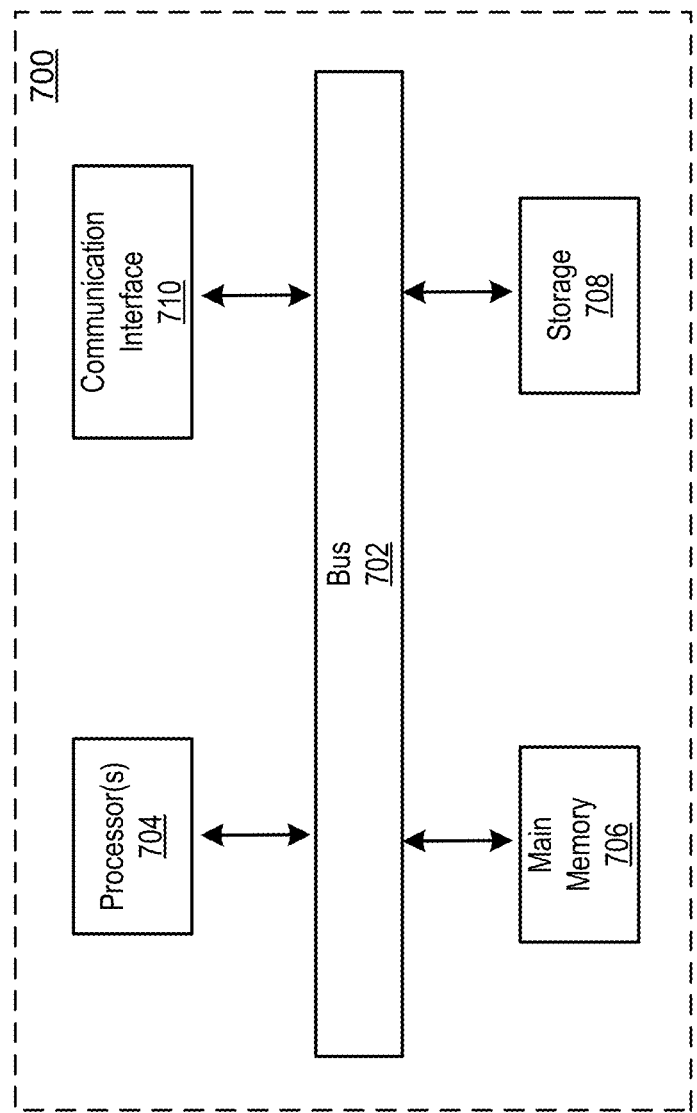
FIG. 7 is a block diagram that illustrates a computer system upon which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor(s) 704. Main memory 706 also may be used for storing temporary variables or other intermediate information during execution of instructions to be executed by processor(s) 704. Such instructions, when stored in storage media accessible to processor(s) 704, render computer system 700 into a special-purpose machine that is customized to perform the operations specified in the instructions. Main memory 706 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 708. Execution of the sequences of instructions contained in main memory 706 causes processor(s) 704 to perform the process steps described herein.

For example, the computing system 700 may be used to implement the computing system 102, the information obtaining component 112, the action decision component 114, and the context string component 116 shown in FIG. 1. As another example, the method shown in FIG. 6 and described in connection with this figure may be implemented by computer program instructions stored in main memory 706. When these instructions are executed by processor(s) 704, they may perform the steps of method 600 as shown in FIG. 6 and described above. In alternative embodiments, hard-wired circuitry may be used in place of or in combination with software instructions.

The computer system 700 also includes a communication interface 710 coupled to bus 702. Communication interface 710 provides a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method for determining a destination, comprising:
    receiving a user speech input through a voice user interface;
    obtaining a plurality of current utterance variables by tokenizing the user speech input;
    determining, by a trained automatic agent, one or more of a plurality of utterance templates for a reply to the user speech input based on the plurality of current utterance variables;
    determining, by the trained automatic agent based on the plurality of current utterance variables, one of a plurality of Application Programming Interfaces (API) to call and one or more parameters for the API to call with, wherein the one or more parameters are based on information of the plurality of current utterance variables;
    obtaining a response from the determined API call; and
    constructing a context string for the reply to the user speech input by the trained automatic agent based on the one or more of the plurality of utterance templates and the response of the API call,
    wherein the trained automatic agent is trained based on a plurality of training samples collected by:
        listing the plurality of utterance templates and the plurality of APIs in a Graphical User Interface (GUI) for a training agent to select from;
        tokenizing a training user speech input into a plurality of training utterance variables; and
        recording one or more of the plurality of training utterance templates, one or more of the plurality of APIs, and one or more of the plurality of training utterance variables that the training agent selects through the GUI in response to the training user speech input as a training sample of the plurality of training samples.

2. The method of claim 1, wherein the plurality of training samples are recorded as fully-executable code.

3. The method of claim 1, further comprising:
    providing a button for the training agent to add a new utterance template that is available for other training agents to use.

4. The method of claim 1, wherein the trained automatic agent comprises a Bidirectional Encoder Representations from Transformers (BERT) natural language processing model.

5. The method of claim 1, wherein the trained automatic agent comprises a generative pre-trained natural language processing model.

6. The method of claim 1, wherein the API call comprises a find-place API call.

7. The method of claim 1, wherein:
    the one or more parameters comprise a name of a trip destination from the plurality of current utterance variables and a starting location obtained locally; and
    the response from the API call comprises a latitude and longitude of a destination prediction.

8. The method of claim 1, wherein:
    the one or more parameters comprise a starting location obtained locally and a destination; and
    the response from the API call comprises a distance and a duration from the starting location to the destination.

9. The method of claim 1, wherein constructing the context string for the reply to the user speech input by the trained automatic agent comprises concatenating at least one of the current utterance variables and the response of the API call onto an existing context string.

10. A system for determining a destination, comprising one or more processors and one or more non-transitory computer-readable memories coupled to the one or more processors and configured with instructions executable by the one or more processors to cause the system to perform operations comprising:
    listing a plurality of utterance templates and a plurality of Application Programming Interfaces (APIs) in a Graphical User Interface (GUI) for a training agent to select from;
    tokenizing a training user speech input into a plurality of training utterance variables; and
    recording one or more of a plurality of training utterance templates, one or more of the plurality of APIs, and one or more of the plurality of training utterance variables that a training agent selects through the GUI in response to the training user speech input to obtain a plurality of training samples;
    obtaining a trained automatic agent trained based on the plurality of training samples;
    receiving a user speech input through a voice user interface;
    obtaining a plurality of current utterance variables by tokenizing the user speech input;
    determining, by the trained automatic agent, one or more of the plurality of utterance templates for a reply to the user speech input based on the plurality of current utterance variables and one of the plurality of APIs to call;
    obtaining a response from the determined API call; and
    constructing a context string for the reply to the user speech input based on the one or more of the plurality of utterance templates and the response of the API call.

11. The system of claim 10, wherein the plurality of training samples are recorded as fully-executable code.

12. The system of claim 10, wherein the trained automatic agent comprises a Bidirectional Encoder Representations from Transformers (BERT) natural language processing model.

13. The system of claim 10, wherein the determining of the one of the plurality of APIs further comprises determining one or more parameters for the API to call with, the one or more parameters comprise a name of a trip destination from the plurality of current utterance variables and a starting location obtained locally; and the response from the API call comprises a latitude and longitude of a destination prediction.

14. The system of claim 10, wherein the determining of the one of the plurality of APIs further comprises determining one or more parameters for the API to call with, the one or more parameters comprise a starting location obtained locally and a destination; and the response from the API call comprises a distance and a duration from the starting location to the destination.

15. The system of claim 10, wherein constructing the context string for the reply to the user speech input comprises concatenating at least one of the current utterance variables and the response of the API call onto an existing context string.

16. A non-transitory computer-readable storage medium configured with instructions executable by one or more processors to cause the one or more processors to perform operations comprising:

listing a plurality of utterance templates and a plurality of Application Programming Interfaces (APIs) in a Graphical User Interface (GUI) for a training agent to select from;

tokenizing a training user speech input into a plurality of training utterance variables; and recording one or more of a plurality of training utterance templates, one or more of the plurality of APIs, and one or more of the plurality of training utterance variables that a training agent selects through the GUI in response to the training user speech input to obtain a plurality of training samples;

obtaining a trained automatic agent trained based on the plurality of training samples;

receiving a user speech input through a voice user interface;

obtaining a plurality of current utterance variables by tokenizing the user speech input;

determining, by the trained automatic agent, one or more of the plurality of utterance templates for a reply to the user speech input based on the plurality of current utterance variables and one of the plurality of APIs to call;

obtaining a response from the determined API call; and constructing a context string for the reply to the user speech input based on the one or more of the plurality of utterance templates and the response of the API call.

17. The non-transitory computer-readable storage medium of claim 16, wherein the determining of the one of the plurality of APIs further comprises determining one or more parameters for the API to call with, the one or more parameters comprise a name of a trip destination from the plurality of current utterance variables and a starting location obtained locally; and the response from the API call comprises a latitude and longitude of a destination prediction.

* * * * *